United States Patent
Davis et al.

(10) Patent No.: US 9,920,869 B2
(45) Date of Patent: Mar. 20, 2018

(54) COOLING SYSTEMS FOR GAS TURBINE ENGINE COMPONENTS

(71) Applicant: UNITED TECHNOLOGIES CORPORATION, Farmington, CT (US)

(72) Inventors: Timothy M Davis, Kennebunk, ME (US); Jeremy Drake, South Berwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 339 days.

(21) Appl. No.: 14/708,825

(22) Filed: May 11, 2015

(65) Prior Publication Data

US 2015/0338005 A1 Nov. 26, 2015

Related U.S. Application Data

(60) Provisional application No. 62/001,918, filed on May 22, 2014.

(51) Int. Cl.
| | |
|---|---|
| F16L 37/00 | (2006.01) |
| F16L 37/086 | (2006.01) |
| F16L 21/02 | (2006.01) |
| F01D 9/06 | (2006.01) |
| F01D 25/24 | (2006.01) |

(52) U.S. Cl.
CPC ............ F16L 37/086 (2013.01); F01D 9/065 (2013.01); F16L 21/02 (2013.01); *F01D 25/24* (2013.01)

(58) Field of Classification Search
CPC .................................. F16L 37/086; F16L 21/02
USPC .......... 285/319, 305, 140.1, 203, 921, 124.4
See application file for complete search history.

(56) References Cited

U.S. PATENT DOCUMENTS

| | | | | |
|---|---|---|---|---|
| 4,482,172 A | * | 11/1984 | DeVera | F16L 5/02 |
| | | | | 285/140.1 |
| 4,887,849 A | * | 12/1989 | Briet | F16L 37/098 |
| | | | | 285/148.13 |
| 5,096,232 A | * | 3/1992 | Fond | F16L 41/14 |
| | | | | 285/133.21 |
| 5,204,499 A | * | 4/1993 | Favalora | H02G 3/0691 |
| | | | | 174/153 R |
| 5,628,617 A | | 5/1997 | Dalton et al. | |
| 5,667,257 A | * | 9/1997 | Butler | F16L 37/008 |
| | | | | 285/212 |

(Continued)

FOREIGN PATENT DOCUMENTS

| | | |
|---|---|---|
| EP | 1378632 A2 | 1/2004 |
| EP | 1705340 A2 | 9/2006 |

(Continued)

OTHER PUBLICATIONS

English Abstract for EP1705340A2—Sep. 27, 2006; 1 pg.

(Continued)

*Primary Examiner* — Aaron M Dunwoody
(74) *Attorney, Agent, or Firm* — Cantor Colburn LLP (57) ABSTRACT

A transfer tube includes a conduit with an inlet and an opposed outlet. The transfer tube also includes a retention tab extending from the inlet and a locking spring tab extending from the outlet. The locking spring tab includes a claw portion extending radially from the locking spring tab of the transfer tube.

18 Claims, 5 Drawing Sheets

(56) References Cited

U.S. PATENT DOCUMENTS

| | | | | |
|---|---|---|---|---|
| 5,692,783 | A * | 12/1997 | Watanabe | B60H 1/00571 |
| | | | | 285/124.4 |
| 6,722,263 | B2 * | 4/2004 | Keller | F02F 3/22 |
| | | | | 285/921 |
| 7,464,966 | B2 * | 12/2008 | Miyajima | F16L 5/10 |
| | | | | 248/56 |
| 7,857,360 | B2 * | 12/2010 | Lambert | F16L 37/098 |
| | | | | 137/528 |
| 2004/0062637 | A1 | 4/2004 | Dube et al. | |
| 2004/0094952 | A1 * | 5/2004 | Twardawski | F16L 5/027 |
| | | | | 285/210 |
| 2005/0057041 | A1 * | 3/2005 | Shida | F02M 35/088 |
| | | | | 285/140.1 |
| 2010/0050649 | A1 | 3/2010 | Allen | |
| 2010/0135786 | A1 | 6/2010 | Manteiga et al. | |
| 2016/0090954 | A1 * | 3/2016 | Amann | F02M 35/10295 |
| | | | | 285/124.4 |

FOREIGN PATENT DOCUMENTS

| | | |
|---|---|---|
| EP | 1972756 A1 | 9/2008 |
| WO | 2013162982 A1 | 10/2013 |

OTHER PUBLICATIONS

English Abstract for EP1972756A1—Sep. 24, 2008; 2 pgs.
European Search Report for Application No. 15167758.0-1610; dated Mar. 23, 2016; 6 pgs.
Partial European Search Report for Application No. 15167758.0-1610; dated Oct. 30, 2015; 5 pgs.

\* cited by examiner

COOLING SYSTEMS FOR GAS TURBINE ENGINE COMPONENTS

CROSS-REFERENCE TO RELATED APPLICATION

This application claims the benefit of priority under 35 U.S.C. § 119(e) to U.S. Provisional Application No: 62/001,918, filed May 22, 2014, which is incorporated herein by reference in its entirety.

GOVERNMENT LICENSE RIGHTS STATEMENT

This invention was made with government support under Contract No. FA8650-09-D-2923 0021 awarded by the United States Air Force. The government has certain rights in the invention.

BACKGROUND OF THE INVENTION

1. Field of the Invention

The present disclosure relates to cooling systems, and more particularly to cooling systems for gas turbine engines.

2. Description of Related Art

Some gas turbine engines include cooling systems for providing secondary flow air to components exposed to hot gases traversing the engine gas path. Transfer tubes (or jumper tubes) typically channel secondary flow air from one cavity to a remote/non-adjacent second cavity for the purpose of routing secondary flow air at suitable pressure and temperature for cooling an intended engine component without excessive leakage into cavities bypassed by the transfer tube. Conventional transfer tubes and transfer tube securing arrangements can add cost, weight, and complexity to the engine. They can also form flow obstructions that potentially impact engine efficiency. Moreover, it is possible for the fit to change during operation due to thermal expansion and contraction, vibration, loading and the like.

Such conventional methods and systems have generally been considered satisfactory for their intended purpose. However, there is still a need in the art for improved systems and methods for cooling components exposed to hot combustion gases. The present disclosure provides a solution for this need.

SUMMARY OF THE INVENTION

A transfer tube includes a conduit with an inlet and an opposed outlet. The transfer tube also includes a retention tab extending from the inlet and a locking spring tab extending from the outlet. The locking spring tab includes a claw portion extending radially from the locking spring tab of the transfer tube.

In certain embodiments, the transfer tube can have a flow area with an oblong shape, such as with an elliptical or racetrack shape. A major axis of the flow area can intersect the retention tab and a minor axis of the flow area can intersect the spring tab. The spring tab can include a cantilevered segment of the conduit. The cantilevered segment can be bounded by a first gap and a second gap either or both of which can terminate in a stress reduction feature. The retention tab can include a plenum engagement surface and the spring tab can include a blade engagement surface. The plenum engagement surface can face the blade engagement surface for maintaining position of the transfer tube by applying a tensile load to the conduit in an installed configuration.

In accordance with certain embodiments, the retention tab can be a first retention tab and the transfer tube can further include second, third, fourth, fifth and sixth retention tabs arranged circumferentially about and radiating outward from the inlet of the transfer tube. The spring tab can be a first spring tab and the transfer tube can include a second spring tab arranged on a side of the body opposite the first spring tab that extends radially outward from the tube outlet.

A transfer tube assembly has a retention tab and a resilient member adjacent the retention tab. The transfer tube assembly also has a seal adjacent the resilient member arranged such that the resilient member biases the seal away from the retention tab. A conduit of the transfer tube is adjacent to the seal.

In certain embodiments, the resilient member can include a spring, such as a wave spring for example. The retention tab can be defined on a periphery of a retention member. The retention member can present a low profile surface to coolant traversing an inlet of the conduit. The profile can include a planar surface. A spacer can extend between the retention member and an interior surface of a coolant plenum for maintaining proper resilient member bias. The spacer and the retention member can have aligned apertures and a fastener extending through the apertures. The resilient member, seal, and retention member can be seated within the coolant plenum and the height of the spacer can be about the same as the combined height of the resilient member and seal.

In accordance with certain embodiments, the retention member retention tab can be a first retention tab and the retention member can include a second retention tab arranged on a periphery of the retention member. The first retention tab can overlay a portion of the inlet in a first retention member position and the second retention member can overlay a portion of the inlet in a second retention member position.

It is also contemplated that in certain embodiments the first retention tab can be integral with the conduit inlet. The second retention tab can extend from an outlet of the conduit. A locking spring tab can extend from the outlet and can include a claw portion extending radially outward from the outlet. The locking spring tab can be disposed within an interior of a gas turbine, such as a stator blade or a rotor blade for example. A resilient member engagement surface can be disposed on the first retention tab, and the spring tab claw can have a blade engagement surface such that the plenum engagement surface faces the blade engagement surface. The conduit can be in tension between a first force applied by the resilient member on the resilient member engagement surface, and an oppositely directed second force applied by the blade on the blade engagement surface. It is further contemplated that the spring tab can have first position and second positions, the first position seating the transfer tube in relation to the seal and resilient member and the second position being radially retracted from the first position for removing and installing the transfer tube.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 8 is a schematic cross-sectional side view of forming tool for the transfer tube of FIG.

5 in accordance with the disclosure, showing a first die forming the tube engagement tabs.

DETAILED DESCRIPTION OF THE PREFERRED EMBODIMENTS

Figure 1:
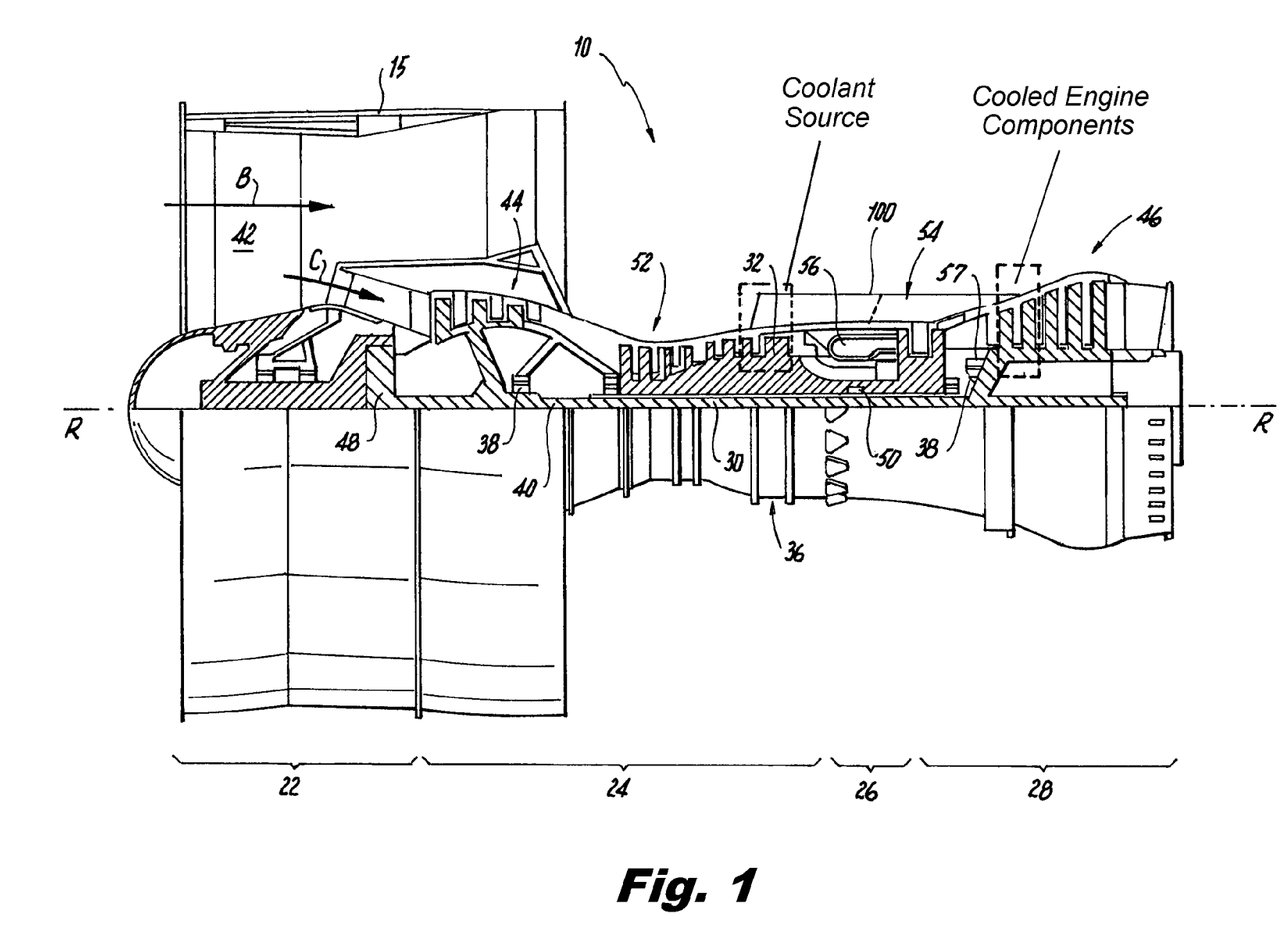
FIG. 1 is a schematic view of an exemplary embodiment of a gas turbine engine constructed in accordance with the present disclosure, showing a cooling system.

Reference will now be made to the drawings wherein like reference numerals identify similar structural features or aspects of the subject disclosure. For purposes of explanation and illustration, and not limitation, a partial view of an exemplary embodiment of the transfer tube in accordance with the disclosure is shown in FIG. 1 and is designated generally by reference character 100. Other embodiments of transfer tubes in accordance with the disclosure, or aspects thereof, are provided in FIGS. 2-9, as will be described. The systems and methods described herein can be used in gas turbine engines, such as aircraft main or auxiliary engines for example.

With reference to FIG. 1, schematically illustrates an exemplary gas turbine engine 10. Exemplary gas turbine engine 10 disclosed herein as a two-spool turbofan that generally incorporates a fan section 22, a compressor section 24, a combustor section 26, and a turbine section 28. Fan section 22 drives air along a bypass flow path B in a bypass duct defined within a nacelle 15, while the compressor section 24 drives air along a core flow path C for compression and communication into combustor section 26 followed by expansion through turbine section 28.

Exemplary gas turbine engine 10 generally includes a low-speed spool 30 and high-speed spool 32 mounted for rotation about an engine rotation axis R relative to an engine static structure 36 via bearings 38. Although depicted as a two-spool turbofan gas turbine engine in the disclosed non-limiting embodiment, it should be understood that the concepts described herein are not limited to use with two-spool turbofans as the teachings may be applied to other types of turbofan engines including three-spool engine architectures. It should also be understood that bearings 38 at various locations may alternatively or additionally be provided, and the location of bearings 38 may be varied as appropriate to the application.

Low-speed spool 30 generally includes an inner shaft 40 that interconnects a fan 42, a low-pressure compressor 44 and a low-pressure turbine 46. Inner shaft 40 is connected to fan 42 through a speed change mechanism 48, which in exemplary gas turbine engine 10 is a gearbox, to drive fan 42 at a lower speed than low-speed spool 30. High-speed spool 32 includes an outer shaft 50 that interconnects a high-pressure compressor 52 and a high-pressure turbine 54.

Combustor 56 is arranged between high-pressure compressor 52 and high-pressure turbine 54. A mid-turbine frame 57 of engine static structure 36 is arranged generally between high-pressure turbine 54 and low-pressure turbine 46. Mid-turbine frame 57 further supports bearings 38 arranged in turbine section 28. Inner shaft 40 and outer shaft 50 are concentric with one another and rotate via bearings 38 about engine rotation axis R that is collinear with rotation axes of inner shaft 40 and outer shaft 50.

Core airflow is compressed by low-pressure compressor 44, further compressed by high-pressure compressor 52, mixed and burned with fuel in combustor 56, and expanded through high-pressure turbine 54 and low-pressure turbine 46. Low-pressure turbine 46 and high-pressure pressure turbine 54 rotationally drive respective low-speed spool 30 and high-speed spool 32 in response to the expansion. A cooling system 100 fluidly couples compressor section 24 with turbine section 28 for providing coolant air to at least one cooled engine component. Cooling system 100 extracts a portion of working fluid traversing core airflow path C and routes the working fluid as to coolant to engine components requiring cooling. As shown in FIG. 1 and described below, coolant system provides coolant from low-pressure compressor 44 to a stator vane 60 (shown in FIG. 2) arranged in high-pressure turbine 54. This is for illustration purposes only and non-limiting. Those skilled in the art will readily appreciate that embodiments of cooling system 100 can provide coolant air from working fluid traversing low-pressure compressor 44 or high-pressure compressor 52, ambient air traversing nacelle 15, or any other suitable coolant source, to any engine component requiring coolant, such as stator vanes, turbine blades, or turbine disks for example.

Figure 2:
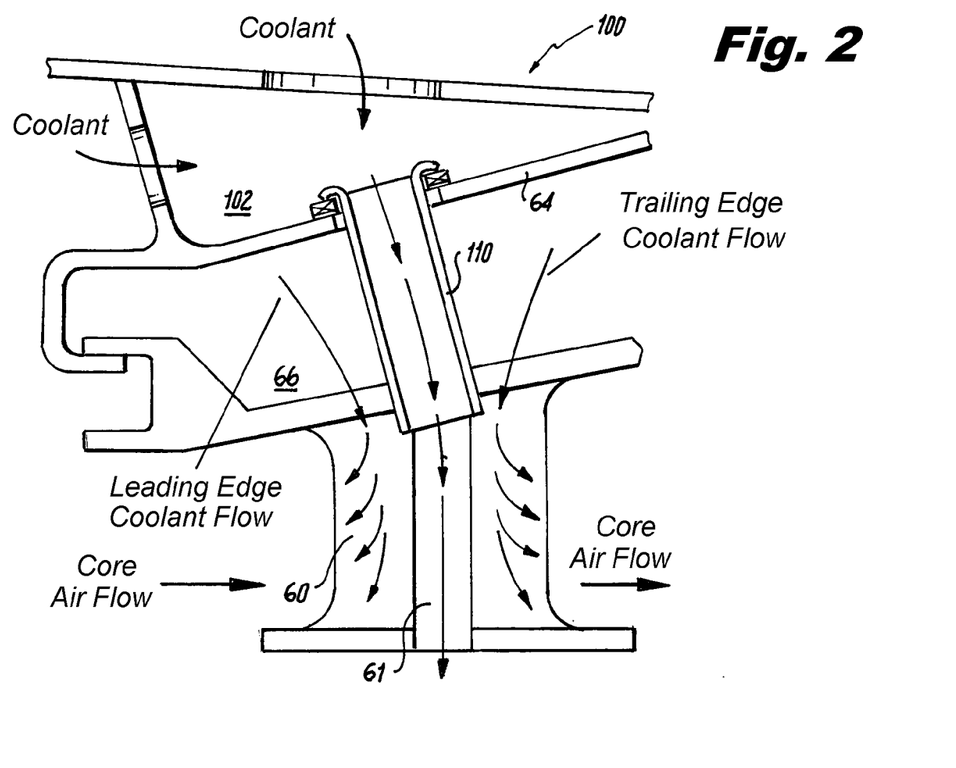
FIG. 2 is a cross-sectional side elevation view of the assembly of FIG. 1, showing a transfer tube extending between a coolant plenum and remote stator vane.

With reference to FIG. 2, a portion of cooling system 100 is shown. Cooling system 100 includes a coolant plenum 102 bounded by a support structure 64, a transfer tube 110, a bypassed cavity 66, and stator vane 60. Coolant plenum 102 is in fluid communication with compressor section 24 (shown in FIG. 1) and receives a flow of coolant therefrom. Stator vane 60 extends into core airflow path and has a coolant channel 61 defined within its interior. It is to be appreciated that coolant channel 61 can define second transfer tube in fluid communication with transfer tube 110. Alternatively, separate coolant channels can provide coolant for cooling stator vane 60 while coolant channel 61 transfers coolant to an adjacent cavity such as with a leading edge coolant flow and a trailing edge coolant flow provided by cavity 66.

Coolant plenum 102 is in fluid communication with remote coolant channel 61 through transfer tube 110. Transfer tube 110 is coupled between coolant plenum 102 and coolant channel 61, a first end being seated in support structure 64 and an opposite second end being seated in stator vane 60 such that coolant flowing through transfer tube 110 bypasses cavity 66. This allows for maintaining a pressure differential between coolant flowing through transfer tube 110 and the interior of bypassed cavity 66. As illustrated, bypassed cavity 66 provides leading and trailing edge coolant flows to stator 60 that are separate from coolant flow provided to channel 61 through transfer tube 110.

Figure 3:
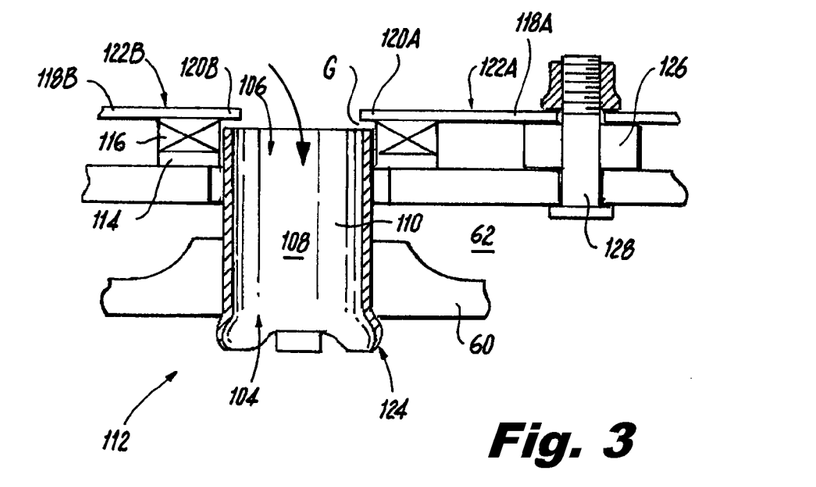
FIG. 3 is a schematic cross-sectional side view of an embodiment of a transfer tube assembly, showing components of the assembly.

With reference to FIG. 3, a transfer tube assembly 112 is shown. Transfer tube assembly 112 includes transfer tube 110, a seal 114, a resilient member 116, a first retention member 118A, and a second retention member 118B. Transfer tube 110 defines a conduit 108, a first end portion 106, and a second end portion 104. First end portion 106 is seated within coolant plenum 102, second end portion 104 is seated within stator vane 60, and conduit 108 extends between first end portion 106 and second end portion 104 such that coolant traversing transfer 110 bypasses adjacent space 62 and is substantially isolated with respect thereto. As will be appreciated by those skilled in the art, loss of coolant airflow into adjacent flow cavities and/or the gas path of exemplary gas turbine engine 10 can have a negative effect on engine fuel burn, performance, efficient, and/or engine component service life.

Seal 114 is adjacent to conduit 108 and sealably engages first end portion 106 of transfer tube 110. Resilient member 116 overlays seal 114 and is adjacent to conduit 108. First retention member 118A and second retention member 118B both overlay resilient member 116 and seal 114 and define a first retention tab 120A and a second retention tab 120B at their respective peripheries. Resilient member 116 biases seal 114 away from first retention tab 120A and second retention tab 120B. Resilient member 116 urges (biases) seal 114 against support structure 64, and as illustrated is a spring.

First retention tab 120A and second retention tab 120B both overlay first end portion 106, and are separated in relation thereto by a gap G. Second end portion 104 defines an arcuate retention structure 124 for seating transfer tube 110 within stator vane 60. Arranging first retention tab 120A and second retention tab 120B over first end portion 106 limits radial displacement of transfer tube 110. Arranging first retention tab 120A and second retention tab 120B with intervening gap G allows for geometry change due to thermal expansion and contraction, and accommodates a predetermined amount of movement of parts in response to engine operation while preventing displacement sufficient to allow leakage into adjacent space 62.

First retention member 118A and second retention member 118B present a first low-profile surface 122A and a second low-profile surface 122B to coolant traversing a first end portion 106, i.e. an inlet, of transfer tube 110 in relation to conventional transfer tube assemblies. First low-profile surface 122A and second low-profile surface 122B are planar surfaces. As shown on the right hand side of FIG. 3, a spacer 126 fixed by a fastener 128 extends between first retention member 118A and an interior surface of a coolant plenum 102 for maintaining proper bias of resilient member 116.

Figure 4:
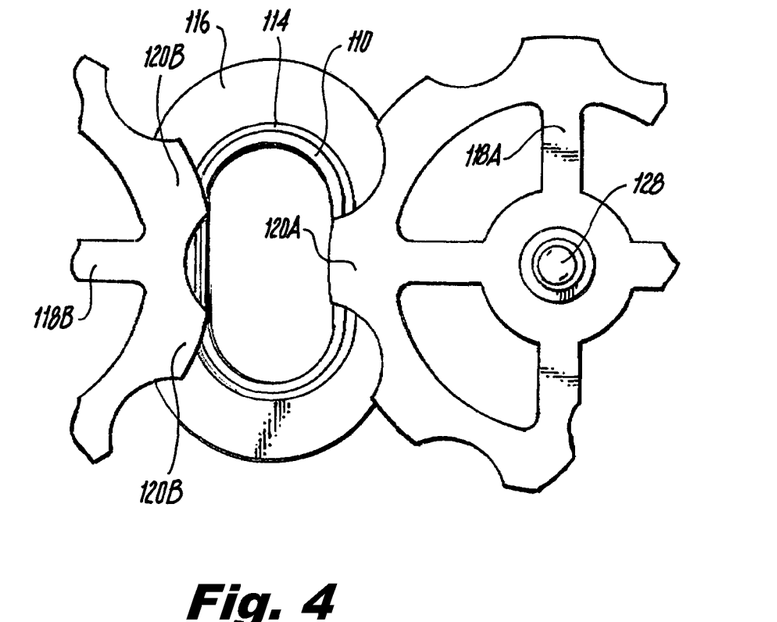
FIG. 4 is a schematic plan view of the transfer tube assembly of FIG. 3, showing retention members arranged in different orientations radially restraining the transfer tube.

With reference to FIG. 4, transfer tube assembly 112 is shown from the perspective of coolant plenum 102 in a plan view. Transfer tube 110 has a flow area with an oblong shape, such as with an elliptical shape or racetrack shape, that conforms to a cross-section profile of stator vane 60 (shown in FIG. 3). In certain embodiments the flow area has a circular shape.

At least one of first retention member 118A and second retention member 118B define a plurality of retention tabs arranged about their respective periphery. In embodiments, it is contemplated that either or both of first retention member 118A and second retention member 118B have eight retention tabs. FIG. 4 shows a portion of first retention member 118A with five retention tabs and a portion of second retention member 118B with four retention tabs for purposes of illustration and not for limitation. It is to be understood that the plurality of retention tabs defined by first retention member 118A and second retention member 118B ensures that at least one of the first retention tabs 120A and at least one of the second retention tabs 120B overlays transfer tube 110 irrespective of orientation of the respective retention member. This provides balanced radial restraint to transfer tube 110 as both lateral sides of transfer tube 110 are restrained by overlaying retention tabs. It can also make assembly mistake proof insofar as first retention member 118A and second retention member 118B radially restrain transfer tube 110 in a plurality of angular positions in relation to fastener 128.

Figure 5:
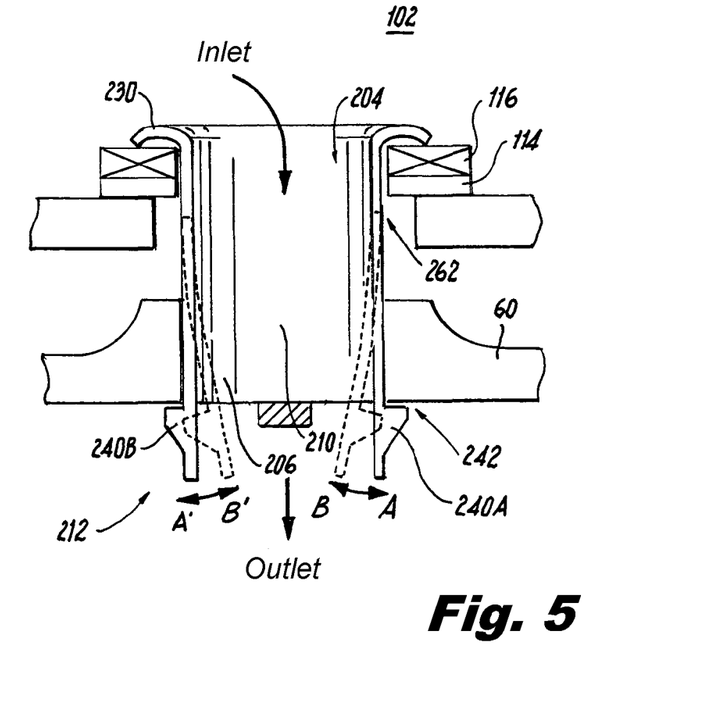
FIG. 5 is a schematic cross-sectional side view of another embodiment a transfer tube assembly, showing components of the assembly.

With reference to FIG. 5, another embodiment of a transfer tube assembly 212 is shown. Transfer tube assembly 212 is similar to transfer tube assembly 112 with the differences that transfer tube assembly 212 does not include retention members, spacers, or fasteners. Instead, transfer tube assembly 212 includes a transfer tube 210 with a first end portion 204 defining an integral retention tab 230 at its inlet, and a second end portion 206 defining a locking spring tab 240A, B.

Integral retention tab 230 extends radially outward with respect to an axis of transfer tube 210 in a gently swept arcuate segment, thereby defining a low profile, curvilinear structure.

Integral retention tab 230 is configured and adapted to engage a resilient member 116 and seal 114, biasing resilient member 116 and seal 114 towards an interior surface of coolant plenum 102.

Locking spring tab 240A, B is also integral with transfer tube 210 and extends radially outward with respect to the axis of transfer tube 210. Locking spring tab 240A, B includes a claw portion 242 configured and adapted to engage an interior portion of stator vane 60. As integral retention tab 230 compresses resilient member 116, resilient member 116 urges transfer tube 210 in an opposite direction. This force is balanced by an equal and opposite force applied to claw portion 242 by stator vane 60, locking spring tab 240A, B and integral retention tab 230 cooperating to place transfer tube 210 in tension between one another. This fixes transfer tube 210 and enables it to reliably couple coolant plenum 102 to stator vane 60 notwithstanding the above-discussed thermally expansion and contraction cycling process, loading from aircraft maneuvering, and the like.

Figure 6:
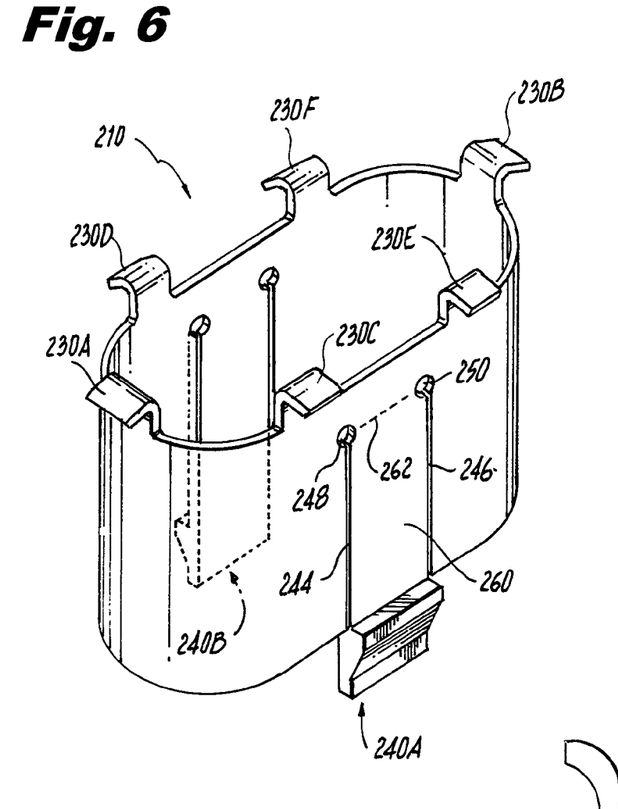
FIG. 6 is a perspective side view of a transfer tube of the transfer tube assembly shown in FIG. 5, showing retention tabs and spring claws defined on opposite ends of the transfer tube.

With reference to FIG. 6, transfer tube 210 is shown. Locking spring tab 240A, B is defined on a radially inner end of a cantilevered segment 260. Cantilevered segment 260 is bounded on one side by a first gap 244 and on another side by a second gap 246. First gap 244 terminates on an end adjacent to integral retention tab 230 in a first stress reduction feature 248. Second gap 246 terminates on an end adjacent to integral retention tab 230 in a second stress reduction feature 250. Between first stress reduction feature 248 and second stress reduction feature 250 transfer tube 210 defines a hinge line 262. Hinge line 262 is configured and adapted to allow for deflection of cantilevered segment 260 between a first position A (shown in FIG. 5 in solid outline) and a second position B (shown in dashed outline in FIG. 5), first position A being the installed position and second position B being for a removal/installation.

As a general matter it is advantageous to avoid coolant leakage from transfer tubes such as is possible through the above-described gaps. However, Applicants have determined that leakage through such gaps can be kept to an acceptable level by controlling the width of such gaps. For example, gaps defined using an electrical discharge machining process having gap widths in the range of about 0.051 millimeters to about 0.102 millimeters (0.002 inches to about 0.004 inches) can have acceptable leakage levels. Similarly, in embodiments having stress reduction features, the stress reduction feature can be sufficiently small due to stress direction in the transfer tube. Therefore, embodiments of transfer tubes described herein can provide structural advantages as well as the ability to remove and reinstall the transfer tube without posing unacceptable sources of coolant leakage.

Transfer tube 210 has a flow area shape similar to that of transfer tube 110, i.e. with an oblong shape. A major axis of the flow area intersects first integral retention tab 230A and opposed second integral retention tab 230B. A minor axis of the flow area intersects a first spring tab 240A and a second spring tab 240B. A third integral retention tab 230C and a fourth integral retention tab 230D are arranged on a side of minor axis including first integral retention tab 230A. A fifth integral retention tab 230E and a sixth integral retention tab 230F are arranged on a side of minor axis including second integral retention tab 230B.

Figure 7:
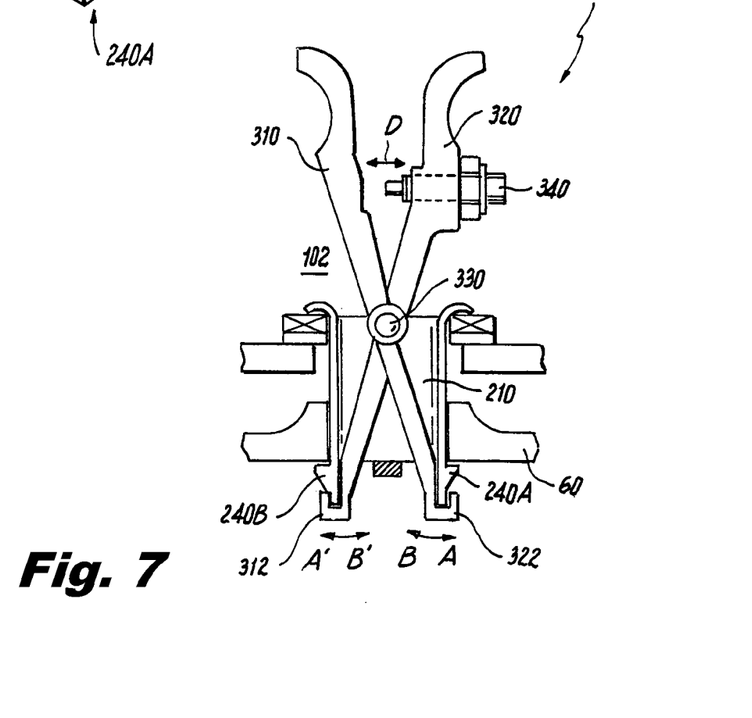
FIG. 7 is a schematic side view of an exemplary transfer tube removal/installation tool for the transfer tube of FIG. 5, showing the tool engaging the transfer tube assembly.

With reference to FIG. 7, a transfer tube removal/installation tool 300 is shown. Transfer tube removal/installation tool 300 includes a first arm 310, a second arm 320, a pivot pin 330, and a set screw 340. First arm 310 defines a first spring tab hook 312 on an end and second arm 320 defines a second spring tab hook 322 on an end adjacent first spring tab hook 312. Pivot pin 330 pivotably couples first arm 310 to second arm 320 and set screw 340 defines a maximum throw distance D from which second spring tab hook 322 can be displaced in relation to first spring tab hook 312. This enables transfer tube removal/installation tool 300 to be inserted into transfer tube 210 such that first spring tab hook 312 engages first spring tab 240A, second spring tab hook 322 engages second spring tab 240B, and first spring tab hook 312 and second spring tab hook 322 displace first spring tab 240A and second spring tab 240B between first positions A and A' (shown in FIG. 5) and second positions B and B' (shown in FIG. 5). This balances forces applied to the first and second spring tab 240A and 240B so that both deflect equally and minimally while enabling removal of transfer tube 210 from stator vane 60 by withdrawing it through coolant plenum 102. Set screw 340 defines a maximum angle between first position A (shown in FIG. 5) and second position B (shown in FIG. 5), thereby preventing plastic deformation along hinge line 262 (shown in FIG. 6) that could otherwise occur. This can allow for re-use of transfer tube 210 after removal. It is to be understood that deflecting both first and second spring tabs 240A and 240B can minimize the maximum deflection and associated stress during installation or removal of the transfer tube.

Figure 8:
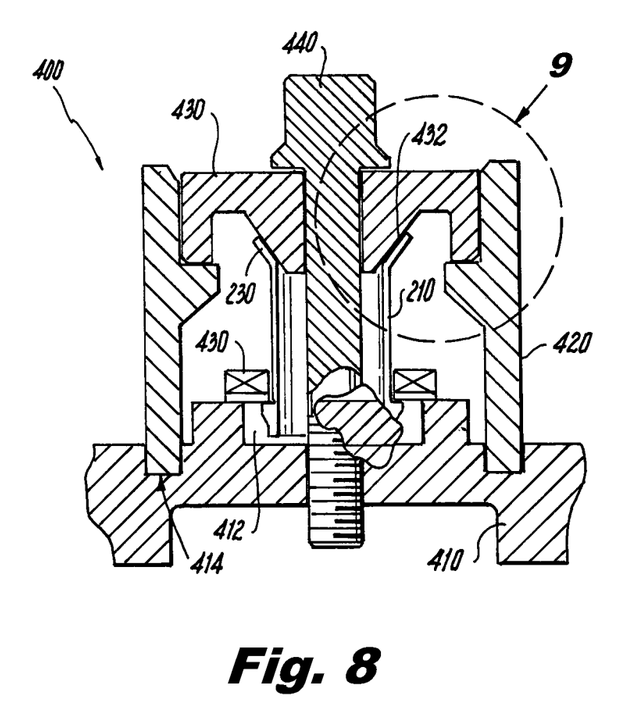

With reference to FIG. 8, a tool 400 for forming integral engagement tab 230 on transfer tube 210 is shown. Tool 400 includes a base 410, a retainer 430, a collar 420, a first die 430, and screw 440. Transfer tube 210 seats within a pocket 412 formed in base 410. Retainer 430 seats over transfer tube 210 and base 410, fixing transfer tube 210 thereto. Collar 420 seats in a socket 414 defined by base 410 extending about transfer tube 210. First die 430 defines a contoured surface 432 facing the inlet end of transfer tube 210 and seats against an annular lip 422 defined by collar 420. Screw 440 is received within an aperture defined by first die 430, extends through transfer tube 210 and is threadably received within base 410. Rotation of screw 440 drives first die 430 toward base 410, urging contoured surface 432 against the inlet end of transfer tube 210, thereby forming engagement tab 230 by displacing a portion of transfer tube 210 outward with respect to an axis of transfer tube 210.

Figure 9:
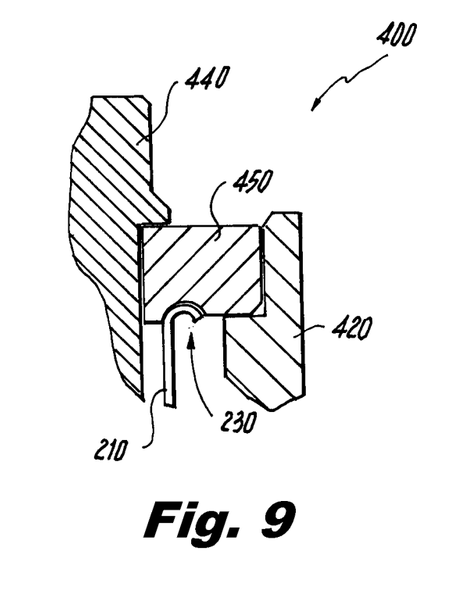
FIG. 9 is a schematic cross-sectional side view of the forming tool of FIG. 8, showing an exemplary embodiment of a second die contouring the tube engagement tabs.

With reference to FIG. 9, a second die 450 is shown for forming integral engagement tab 230 on transfer tube 210. Second die 450 is similar to first die 430 with the difference that second die 450 has a contoured surface 452 with a different profile than that of first die 430. Specifically, contoured surface 452 of second die 450 continues the deformation process initiated by first 430 by curling over the portion of the inlet end of transfer tube 210, thereby forming the above-discussed plurality of low-profile integral engagement tabs 230.

In embodiments, transfer tubes described herein can convey coolant between remote or non-adjacent cavities with reduced pressure loss and/or leakage into adjacent or bypassed cavities. Such transfer tubes can also keep the bypassed cavity from being needlessly pressurized, potentially preventing pressurization of the bypassed cavity or otherwise causing further leakage from the bypassed cavity into the gas path. In certain embodiments, transfer tube 110 forms a component of a reduced parts count transfer tube assembly 112 with reduced weight, cost and/or complexity and which has improved reliability with respect to conventional transfer tube assemblies due the structure of transfer tube 110 being able to maintain close fit under a variety of loading conditions, such as aircraft maneuvering, high-velocity flow, vibration, and/or thermal or mechanical driven relative motion between components spanned by transfer tube 110.

The methods and systems of the present disclosure, as described above and shown in the drawings, provide for coolant transfer tubes with superior properties including a reduced part count assembly, reduced coolant flow obstruction, and/or mistake proof assemblies. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A transfer tube, comprising:
   a conduit with an inlet and an opposed outlet, the outlet defines an arcuate retention structure;
   a retention tab extending from the inlet; and
   a locking spring tab extending from the outlet, wherein the locking spring tab includes a claw portion extending radially outward from the locking spring tab.

2. A tube as recited in claim 1, wherein a plenum engagement surface disposed on the retention tab faces a blade engagement surface disposed on the spring tab for maintaining position of the transfer tube by applying a tensile load to the conduit in an installed configuration.

3. A tube as recited in claim 1, wherein the spring tab includes a cantilevered segment of the conduit.

4. A tube as recited in claim 3, wherein at least one of a first gap and a second gap bounding the cantilevered segment terminate in a stress reduction feature.

5. A tube as recited in claim 1, wherein the transfer tube has a flow area with an oblong shape, wherein a major axis of oblong flow area intersects the retention tab and a minor axis of the flow area intersects the spring tab.

6. A tube as recited in claim 1, wherein the retention tab is a first retention tab and the spring tab is a first spring tab, and further including:

second, third, fourth, fifth and sixth retention tabs arranged circumferentially about and extending radially outward from the inlet; and a second spring tab arranged opposite the first spring tab, wherein the second spring tab extends radially outward from the outlet.

7. A transfer tube assembly, comprising:

a transfer tube that defines a conduit that extends between a first end portion that is seated in a support structure and a second end portion that is opposite the first end portion;

a first retention member at the first end portion and defines a first retention tab and overlays a resilient member; and a seal engages the first end portion and is overlaid by the resilient member, wherein the resilient member biases the seal against the support structure.

8. An assembly as recited in claim 7, wherein the first retention tab is defined on a periphery of the first retention member.

9. An assembly as recited in claim 8, further including a spacer extending between the first retention member and the support structure that bounds a coolant plenum for maintaining proper resilient member bias.

10. An assembly as recited in claim 9, wherein in the spacer and first retention member have aligned apertures, and further including a fastener extending through the apertures.

11. An assembly as recited in claim 10, wherein the resilient member, seal, and first retention member are seated within the coolant plenum, and wherein a height of the spacer is about the same as a combined height of the resilient member and seal.

12. An assembly as recited in claim 8, further including a second retention tab arranged on a periphery of a second retention member, wherein the first retention tab overlays a portion of the first end portion in a first retention member position and the second retention member overlays a portion of the first end portion in a second retention member position.

13. An assembly as recited in claim 7, wherein the first retention tab is integral with the conduit.

14. An assembly as recited in claim 7, wherein further including a second retention tab extending from the second end portion of the conduit.

15. An assembly as recited in claim 14, further including a locking spring tab extending from the second end portion, wherein the locking spring tab includes a claw portion extending radially outward from the second end portion.

16. An assembly as recited in claim 15, wherein the first retention tab has a resilient member engagement surface and the spring tab claw has a blade engagement surface, wherein a plenum engagement surface faces the blade engagement surface.

17. An assembly as recited in claim 16, wherein the conduit is in tension between (a) a first force applied by the resilient member on the resilient member engagement surface, and (b) an oppositely directed second force applied by the blade on the blade engagement surface.

18. An assembly as recited in claim 15, wherein the spring tab has a first position for seating the transfer tube in relation to the seal and resilient member and a second position radially retracted from the first position for removing and installing the transfer tube.

* * * * *